Patented May 4, 1937

2,078,978

UNITED STATES PATENT OFFICE 2,078,978

METHOD OF OBTAINING HORMONE-LIKE KETONIC SUBSTANCES

Erwin Schwenk, Montclair, N. J., and Bradley Whitman, New York, N. Y., assignors, by mesne assignments, to Schering Corporation, Bloomfield, N. J., a corporation of New Jersey No Drawing. Application November 5, 1934, Serial No. 751,578

11 Claims. (Cl. 260—131)

The present invention relates to the treatment, and more specifically to the oxidation, of dihydrocholesterol, dihydroepicholesterol, their derivatives and related hydrocarbon and other substances for the production of neutral ketonic bodies having the properties of the male hormone, i. e. the ability to produce growth of the comb in the castrated cock and to cause enlargement of the seminal vesicles of castrated rats.

It is the object of the invention to provide an improved method for the oxidation of dihydrocholesterol, dihydroepicholesterol, and similar substances, whereby improved yields of the hormone or hormone-like substances are obtained.

We have found that improved results from the standpoint of yields and process control can be obtained if esters of the dihydrocholesterol and dihydroepicholesterol are used which have a free acidic group and are able to form soluble salts. Such esters include, for instance, phthalic acid esters, succinic half esters, and esters of sulphuric acid, like the sulphuric acid ester of the formula:

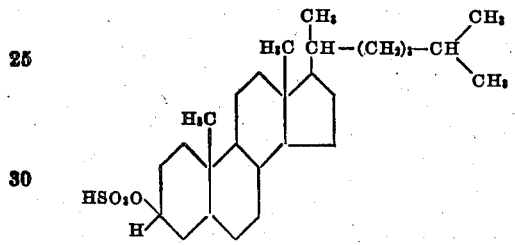

This procedure has the additional advantage that also other means than acid oxidation can be used. In the case of inorganic esters, like sulphuric acid esters, only alkaline oxidation solutions are suitable because such esters are easily split by an acid medium.

The invention will be described in greater detail with the aid of the following examples which illustrate a number of satisfactory procedures for carrying out the invention.

Example 1

10 gr. of the sodium salt of the sulphuric acid ester of dihydrocholesterol, which can be prepared by reaction upon a solution of dihydrocholesterol in pyridine with a 5% excess above the theoretical amount of chloro-sulfonic acid, followed by treatment with sodium hydroxide, are dissolved in water and heated to gentle boiling. A solution of potassium permanganate is then introduced, drop by drop, into the boiling liquid and boiling is continued. After the precipitation of manganese dioxide has begun, the reaction is kept running by continuing the addition of the permanganate solution. The reaction can also be carried out at room temperature. After adding about five molecules of free oxygen per molecule of ester, the reaction is stopped by adding a reducing agent, like alcohol, to destroy the surplus of permanganate. The filtered solution is then acidified with a mineral acid and boiled to split the sulphuric esters present. The reaction mixture is now extracted with ether and the ether solution washed with a solution of alkali to remove the acids. After evaporation of the ether an oily mass remains from which the isolation of the ketones formed can be accomplished by known means, that is, by forming an oxime or semicarbazone in the manner well understood in the art, and splitting such compounds after recrystallization, or by distillation, etc. The corresponding salt of dihydroepicholesterol can be treated in the same way.

Example 2

10 gr. of the phthalic acid ester of dihydroepicholesterol or of dihydrocholesterol in the form of its sodium salt are dissolved in water and then treated with concentrated hydrogen peroxide of 15–30 vol. per cent. A little ferrous sulphate is added as catalyst and the reaction mixture is heated for three hours to gentle boiling. Then the reaction mass is saponified by adding a solution of 5 gr. of sodium hydroxide in water and boiled under reflux for approximately five hours, the phthalic esters being thus split, and upon cooling, a mass consisting of unattacked dihydroepicholesterol and the reaction products crystallizes out, from which the ketonic substances are isolated by known processes as mentioned above.

Example 3

10 gr. of the succinic acid ester of dihydrocholesterol are dissolved in half a liter of sodium hydroxide solution of such strength that only a slight excess of sodium hydroxide is present. The solution is then acidified with nitric acid until a concentration of 10% nitric acid results. ½ gr. of mercuric nitrate is added and the reaction mixture is then heated to boiling, whereupon red vapors of nitrous acid are given off. After five hours of boiling, the reaction mass is worked up in the manner indicated hereinabove.

Example 4

10 gr. of benzoyldihydroepicholesterol are mixed with 1 gr. of red phosphorus and 10 gr. of bromine are added, drop by drop, whereupon development of hydrobromic acid begins. When the formation of hydrobromic acid has slackened, the liquid mass is taken up with ether, the solution washed with sodium carbonate solution until all the acid is removed, and the ether then evaporated. The remaining oily mass contains bromination products of the starting material, and is dissolved in alcohol and then saponified by adding a solution of 5 gr. KOH in alcohol to such alcoholic solution, which then is boiled for ten hours. The bromine groups in the molecule are thus replaced by hydroxyl groups. The reaction mass is cooled and poured into water. The reaction product which separates as a very thick oil is washed with water several times to free it from the alkali. Then it is dried thoroughly in vacuum and treated with benzoylchloride to esterify the OH group once more. After this the material is dissolved in acetic acid and oxidized with a solution of chromic acid in acetic acid containing 5 gr. of chromic acid. The solution is heated to about 80° and held at this temperature for five hours. After pouring the reaction mass into water the reaction products which precipitate are thoroughly washed with water, then dissolved in ether and the ether solution extracted with alkali to remove all acid reaction products. In the ether remain the neutral ketonic reaction products, which are worked up as mentioned above.

*Example 5*

The alcohol $C_{19}H_{30}O$, which is prepared by heating dihydrocholesterol or dihydroepicholesterol with cuprous chloride and fractional distillation of the reaction product, is dissolved in chloroform and the calculated amount of a solution of perbenzoic acid is added. After standing for 24 hours the chloroform is evaporated and the reaction product is taken up with a 5% sulphuric acid solution and boiled for five hours. The product, which forms a half crystalline mass, is then separated from the liquid and recrystallized, as from alcohol, acetone or ethyl acetate. In this way dihydrocholesterol gives a ketone of M. P. 174°, and dihydroepicholesterol a ketone with a melting point of 180°. Both substances show the properties of the male hormone.

*Example 6*

Through a tube containing pieces of pumice previously impregnated with vanadium oxide, which is heated to about 350° C., vapors of benzoyldihydroepicholesterol or of benzoyldihydrocholesterol are driven by means of a current of air. The reaction product consists of an oil containing crystals and is worked up by known methods. There is thus obtained a ketone as mentioned above.

We claim:

1. The method of producing substituted cyclic ketones having a cyclopentano polyhydro phenanthrene nucleus which comprises subjecting a compound of the general formula

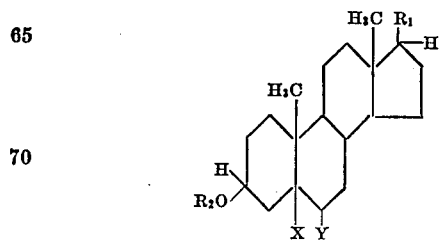

wherein $R_1$ is an aliphatic side chain, $R_2$ is an acyl residue containing a group capable of forming water-soluble salts, and X and Y are members of the group consisting of hydrogen and halogen, to the action of oxidizing agents which split off the side chain, and then separating the polynuclear ketonic material from the reaction mass.

2. The method of producing substituted cyclic ketones having a cyclopentano polyhydro phenanthrene nucleus which comprises subjecting a compound of the general formula

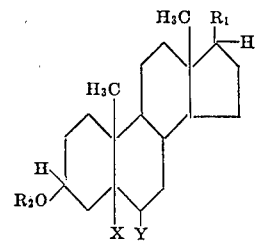

wherein $R_1$ is an aliphatic side chain, $R_2$ is the residue of a polybasic acid, and X and Y are members of the group consisting of hydrogen and halogen, to the action of oxidizing agents which split off the side chain, and then separating the polynuclear ketonic material from the reaction mass.

3. The method of producing substituted cyclic ketones having a cyclopentano polyhydro phenanthrene nucleus which comprises subjecting a compound of the general formula

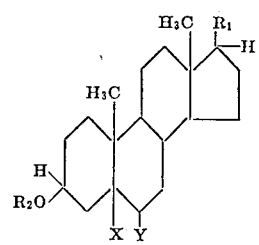

wherein $R_1$ is an aliphatic side chain, $R_2$ is the residue of a polybasic organic acid and contains a free carboxylic group, and X and Y are members of the group consisting of hydrogen and halogen, to the action of oxidizing agents which split off the side chain, and then separating the polynuclear ketonic material from the reaction mass.

4. The method of producing substituted cyclic ketones having a cyclopentano polyhydro phenanthrene nucleus, which comprises subjecting a compound of the general formula

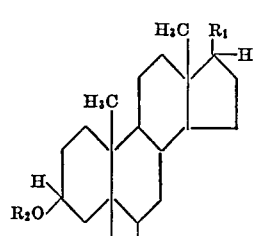

wherein $R_1$ is an aliphatic side chain and $R_2$ is an acyl residue containing a group capable of forming water-soluble salts, to the action of oxidizing agents which split off the side chain, and then separating the polynuclear ketonic material from the reaction mass.

5. The method of producing substituted cyclic ketones having a cyclopentano polyhydro phenanthrene nucleus, which comprises subjecting a compound of the general formula

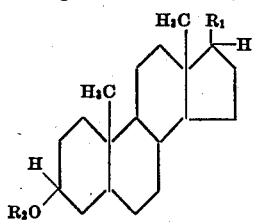

wherein R₁ is an aliphatic side chain and R₂ is an acyl residue containing a group capable of forming water-soluble salts, to the action of an oxidizing agent of the group consisting of potassium permanganate, hydrogen peroxide, nitric acid, chromic acid, perbenzoic acid, peracetic acid, air and oxygen to split off the side chain, and then separating the polynuclear ketonic material from the reaction mass.

6. The method of producing substituted cyclic ketones having a cyclopentano polyhydro phenanthrene nucleus which comprises subjecting a compound of the general formula

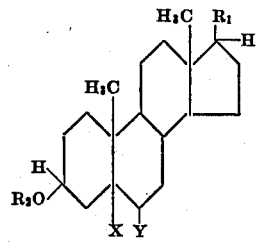

wherein R₁ is an aliphatic side chain, R₂ is the residue of a polybasic acid and contains an acid group capable of forming water-soluble compounds, and X and Y are members of the group consisting of hydrogen and halogen, to the action of oxidizing agents which split off the side chain, and then separating the polynuclear ketonic material from the reaction mass.

7. The method of producing ketonic bodies having the properties of the male hormone, which comprises oxidizing a member of the group consisting of the phthalic, succinic and sulphuric acid esters of a hydrogenated cholesterol, and then after saponification extracting the neutral, ketonic material from the reaction product.

8. The method which comprises reacting a soluble salt of the sulphuric ester of dihydrocholesterol with potassium permanganate, acidifying and boiling the solution, extracting the reaction mixture with an organic solvent for the ketonic substances present, washing such extract with a basic material to remove acids present, evaporating the organic solvent and then isolating the ketones from the resulting residue.

9. The method which comprises reacting the sodium salt of the sulphuric ester of a hydrogenated cholesterol with potassium permanganate in alkaline solution, adding a reducing agent to decompose excess permanganate, acidifying the solution, extracting the mixture with ether and washing the ether extract with alkali to remove free acids, evaporating the ether extract and then treating the oily residue to isolate the ketonic substances contained therein.

10. The method which comprises treating a soluble salt of the phthalic acid ester of a hydrogenated cholesterol with hydrogen peroxide in aqueous solution, saponifying the reaction mass with an alkali hydroxide, and then extracting the ketonic substances from the resulting reaction mass.

11. The method which comprises dissolving the succinic acid ester of a hydrogenated cholesterol in a sodium hydroxide solution, acidifying the solution with nitric acid, adding mercuric nitrate to the mixture and after heating the latter extracting the ketones from the resulting reaction mass.

ERWIN SCHWENK.
BRADLEY WHITMAN.